I. C. SINGER.
Bending and Setting Tires.
No. 37,890. Patented March 10, 1863.
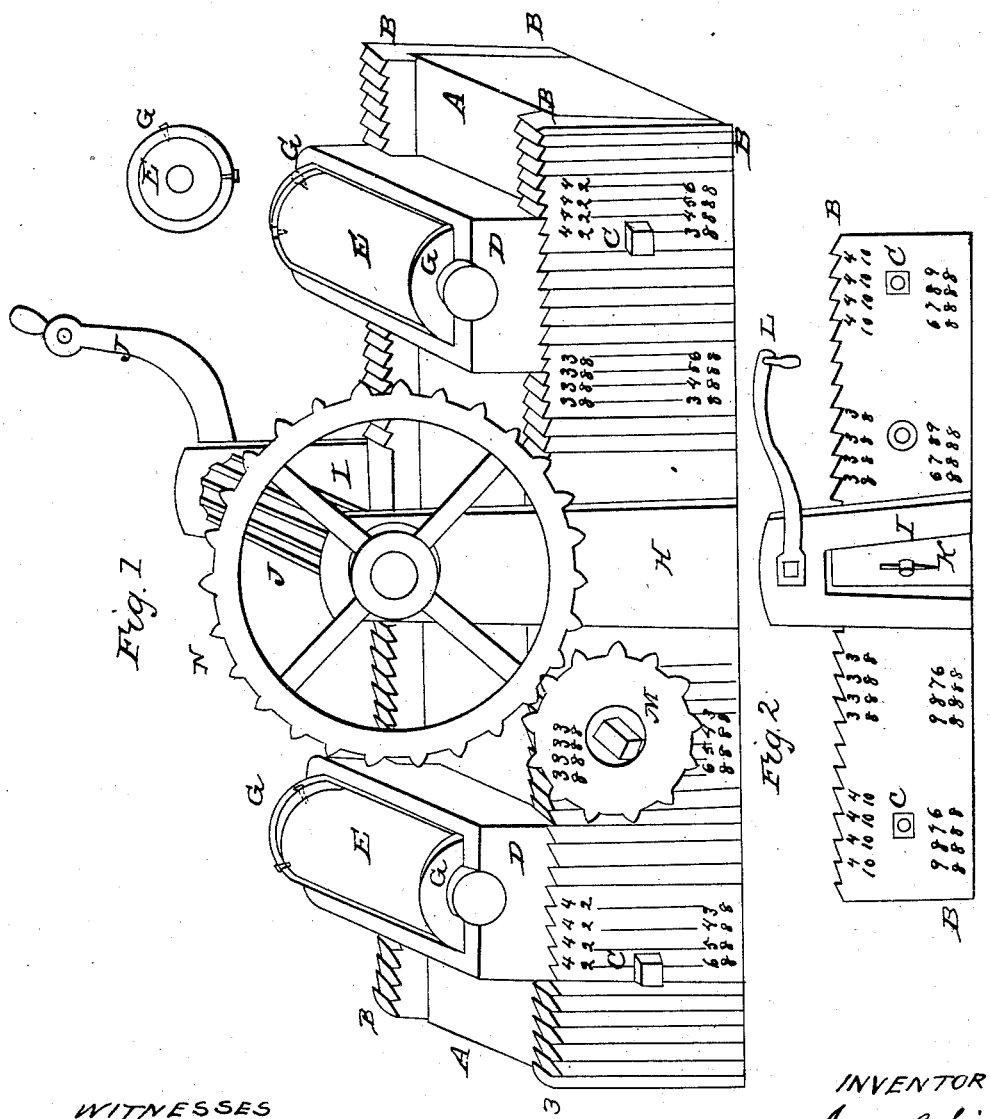
WITNESSES
A. J. Riley
O. K. Harris
INVENTOR
Isaac C. Singer
by his Atty.
J. Franklin Rugarts

UNITED STATES PATENT OFFICE.

ISAAC C. SINGER, OF EBENSBURG, PENNSYLVANIA.

IMPROVEMENT IN BENDING AND SETTING TIRE.

Specification forming part of Letters Patent No. 37,890, dated March 10, 1863.

*To all whom it may concern:*

Be it known that I, ISAAC C. SINGER, of Ebensburg, Cambria county, State of Pennsylvania, have invented new and useful Improvements in Machines for Bending and Setting Tire for Wagons and Carriages; and I do hereby declare that the following is a full and exact description thereof, reference being had to the accompanying drawings, and to the letters of reference marked thereon, making a part of this specification.

The nature of my invention consists in the arrangement and combination of rack-plates, fluted and movable rollers, with a side gage to direct the eye and set the tire to the circle required.

To enable others skilled in the art to make and use my invention, I will proceed to describe its construction and operation, as follows:

Figure 1 represents a perspective view of the machine; Fig. 2, a view of the opposite side.

A represents the solid block and body of the machine, which is of wood, about five inches wide by six inches deep. B represents the cast-iron plates, (with rack on top,) which are bolted fast to the block A, on each side of block, by bolts and nuts C. The racks on the top edge of the plates have their points inclining to the center, and the bottom sides of the movable boxes D that support the rollers E have their racks with their points inclining outward from the center, so as to fit closely and firmly into the racks of the plates B, whenever the boxes D are shifted back or forward, to or from the center, for the purpose of regulating the different-sized circles to which the bar or tire is to be bent. The boxes D are square iron boxes upon which the iron rollers E operate. The rollers E have collars G on each end, which hold the bar or tire square while bending. One of the collars G is fastened by screws to the rollers E, and is movable. Two iron uprights, H and I, fastened to the center on each side of machine, support the stationary fluted roller J. The upright I is movable. It is held to the machine by a key-bolt, K. By taking out the key K and removing the upright I heavy tire or bands that have been bent into a circle can be instantly removed without deranging the machine. The crank L is applied either to the shaft of the small gear-wheel, M, or large gear-wheel, N, so that whenever it is necessary to increase the speed of the machine for light work the crank is applied to the shaft of the large wheel, N. The fluted roller J grips and draws the bar through, and the movable or portable rollers E are set toward the center, according to the size of the circle that the tire or bar is required to be bent, the bar moving under the roller J and on top of the rollers E. The gage or figures on the sides of the plates B direct the eye and show where to set the boxes D to bend the bar or tire to any desired circle to suit different-sized wheels, the figures being stamped on the sides of the plates B, on a line perpendicular to the pointed end of each tooth of the rack B and rack of boxes D.

The advantages of this machine are: First, it is a simple, cheap, and powerful machine, not liable to get out of order; second, it gages, bends, and forms the bar into the circle required, and keeps it square without any twist; third, it draws the bar through without pushing or using sand; fourth, its speed can be increased for light work.

What I claim as my invention, and desire to secure by Letters Patent, is—

The arrangement and combination of the rack-plates B, the movable upright I, the fluted roller J, the portable rollers E, with movable collars G, as operated by gear-wheels M and N, and gaged by figures, as described, and for the purposes herein set forth.

ISAAC C. SINGER.

Witnesses:
 H. KINKEAD,
 A. C. MULLIN.